United States Patent
Han et al.

(10) Patent No.: US 11,938,424 B2
(45) Date of Patent: Mar. 26, 2024

(54) FILTER MODULE FOR GRAVITY-BASED WATER PURIFICATION DEVICE AND GRAVITY-BASED WATER PURIFICATION DEVICE INCLUDING THE SAME

(71) Applicant: AMOGREENTECH CO., LTD., Gimpo-si (KR)

(72) Inventors: Kyung Gu Han, Gimpo-si (KR); Sung Bin Lee, Gimpo-si (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 446 days.

(21) Appl. No.: 17/312,455

(22) PCT Filed: Nov. 26, 2019

(86) PCT No.: PCT/KR2019/016316
§ 371 (c)(1),
(2) Date: Jun. 10, 2021

(87) PCT Pub. No.: WO2020/122465
PCT Pub. Date: Jun. 18, 2020

(65) Prior Publication Data
US 2022/0054958 A1    Feb. 24, 2022

(30) Foreign Application Priority Data
Dec. 11, 2018 (KR) .......................... 10-2018-0159135

(51) Int. Cl.
*B01D 29/05* (2006.01)
*B01D 29/52* (2006.01)
(Continued)

(52) U.S. Cl.
CPC ............. *B01D 29/05* (2013.01); *B01D 29/52* (2013.01); *B01D 35/02* (2013.01); *B01D 35/303* (2013.01);
(Continued)

(58) Field of Classification Search
CPC ........ B01D 29/05; B01D 29/52; B01D 35/02; B01D 35/303; B01D 35/0276;
(Continued)

(56) References Cited

U.S. PATENT DOCUMENTS

2010/0000935 A1    1/2010  Sakai et al.
2010/0096317 A1*   4/2010  Morita ................. B01D 63/081
                                                    210/321.84
(Continued)

FOREIGN PATENT DOCUMENTS

JP    2002-113338 A       4/2002
JP    2002113338 A   *    4/2002
(Continued)

OTHER PUBLICATIONS

International Search Report issued in PCT/KR2019/016316 dated Mar. 13, 2020, 2 pages.

*Primary Examiner* — Liam Royce
(74) *Attorney, Agent, or Firm* — ROTHWELL, FIGG, ERNST & MANBECK, P.C.

(57) ABSTRACT

A filter module for a gravity-based water purification device is provided. A filter module for a gravity-based water purification device, according to one embodiment of the present invention, comprises: a support frame including a loop-shaped edge member, which includes an empty space of which both sides are open, and a dividing member, which is coupled to the edge member so as to enable the empty space to be divided into a plurality of storage spaces; a pair of filtering members which are formed in a plate shape having a predetermined area, and which are coupled to the support frame so as to enable filtered water to be produced from raw water moving from the outside toward the plurality of storage spaces; and water-collecting ports for discharging, to the outside, the filtered water stored in the plurality of storage spaces, wherein the plurality of storage spaces (Continued)

communicate with each other through at least one communication passage formed at the dividing member.

19 Claims, 14 Drawing Sheets

(51) Int. Cl.
| | | |
|---|---|---|
| *B01D 35/02* | (2006.01) | |
| *B01D 35/30* | (2006.01) | |
| *B01D 63/08* | (2006.01) | |
| *B01D 69/06* | (2006.01) | |
| *B01D 69/10* | (2006.01) | |
| *B01D 69/12* | (2006.01) | |
| *C02F 1/00* | (2023.01) | |

(52) U.S. Cl.
CPC .......... *B01D 63/082* (2013.01); *B01D 69/06* (2013.01); *B01D 69/10* (2013.01); *B01D 69/1213* (2022.08); *B01D 69/1216* (2022.08); *C02F 1/001* (2013.01); *B01D 2201/0415* (2013.01); *B01D 2201/303* (2013.01); *B01D 2313/125* (2013.01)

(58) Field of Classification Search
CPC .... B01D 69/06; B01D 69/10; B01D 69/1213; B01D 69/1216; B01D 2201/0415; B01D 2201/303; B01D 2201/24; B01D 2313/125; B01D 36/001; B01D 63/082–0822; C02F 1/001; C02F 1/003; C02F 2303/04

See application file for complete search history.

(56) References Cited

U.S. PATENT DOCUMENTS

| | | | | |
|---|---|---|---|---|
| 2010/0282663 A1* | 11/2010 | Hunt | .................... | B01D 63/082 |
| | | | | 210/323.1 |
| 2013/0118973 A1* | 5/2013 | Seo | ........................ | B01D 71/46 |
| | | | | 156/244.11 |
| 2014/0263025 A1* | 9/2014 | Maxwell | .............. | B01D 63/082 |
| | | | | 427/244 |
| 2019/0247772 A1 | 8/2019 | Han | | |

FOREIGN PATENT DOCUMENTS

| | | |
|---|---|---|
| JP | 2007-061787 A | 3/2007 |
| KR | 20-0223759 Y1 | 5/2001 |
| KR | 10-2008-0110862 A | 12/2008 |
| KR | 10-2012-0073378 A | 7/2012 |
| KR | 10-2018-0116667 A | 10/2018 |

* cited by examiner

FILTER MODULE FOR GRAVITY-BASED WATER PURIFICATION DEVICE AND GRAVITY-BASED WATER PURIFICATION DEVICE INCLUDING THE SAME

CROSS REFERENCE TO RELATED APPLICATION

This application is the national phase entry of International Application No. PCT/KR2019/016316, filed on Nov. 26, 2019, designating the United States, which is based upon and claims priority to Korean Patent Applications 10-2018-0159135, filed on Dec. 11, 2018, the entire contents of which are incorporated herein by reference.

TECHNICAL FIELD

The present invention relates to a filter module for a water purification device and a gravity-based water purification device including the same.

BACKGROUND

Supplying clean and safe water is essentially necessary for health and survival of humans. However, since clean water is not sufficiently supplied in Africa or developing countries, water in a contaminated pond or puddle is frequently used as drinking water.

When contaminated water is drunk, a variety of diseases may occur due to microbes included in the contaminated water. That is, the contaminated water causes diseases such as stomachache, diarrhea, vomit, and the like and has a problem that a life of a person who drinks the water is threatened in a severe case.

Accordingly, to prevent this, it is very important not to allow food or water to be contaminated by microbes.

Currently, since the overall mortality rate of developing countries may be lowered merely by securing clean water and enough food, the effect of environmental improvement that can be prevented through supply of clean water may be considered as being much greater than medical advance or therapeutic development.

However, since a general water purifier employs a principle of passing raw water through a filter by applying a certain water pressure to purify the raw water, a pump facility configured to provide the certain water pressure is necessary, and to this end, it is necessary to provide electrical facilities configured to provide power. In a situation without the above facilities, there is a limitation in using a general water purifier.

SUMMARY OF THE INVENTION

The present invention is directed to providing a filter module for a gravity-based water purification device configured to simply produce filtered water using gravity and a gravity-based water purification device.

The present invention is also directed to providing a filter module for a gravity-based water purification device configured to efficiently produce filtered water while reducing manufacturing costs and a gravity-based water purification device.

One aspect of the present invention provides a filter module for a gravity-based water purification device. The filter module includes a support frame including a loop-shaped edge member having an empty space with both open surfaces and a compartment member coupled to the edge member and configured to compart the empty space into a plurality of storage spaces, a pair of filtration members formed to have a plate shape with a certain area and coupled to the support frame to produce filtered water from raw water moving from the outside to the plurality of storage spaces, and a water outlet configured to discharge the filtered water stored in the plurality of storage spaces to the outside. Here, the plurality of storage spaces communicate with each other through at least one communication path formed in the compartment member.

Another aspect of the present invention provides a filter module for a gravity-based water purification device. The filter module includes a first support frame and a second support frame each including a loop-shaped edge member having an empty space with both open surfaces and a compartment member coupled to the edge member and configured to compart the empty space into a plurality of storage spaces, the first support frame and the second support frame being disposed to be parallel and spaced apart from each other, a plurality of filtration members formed to have a plate shape with a certain area and coupled to the first support frame and the second support frame, respectively, to produce filtered water from raw water moving from the outside to the plurality of storage spaces, at least one common water outlet member configured to integrate filtered water stored in a storage space of the first support frame with filtered water stored in a storage space of the second support frame, and a water outlet coupled to the common water outlet member to discharge the filtered water to the outside. Here, the plurality of storage spaces formed in each of the first support frame and the second support frame communicate with each other through at least one communication path formed in the compartment member.

The communication path may be an accommodation groove recessively formed in the compartment member.

The edge member may include a step portion formed along an inner edge, and an edge side of the filtration member may be fixed to the step portion. In this case, a thickness of a part of the compartment member where the communication path is not formed may have the same thickness as that of a part of the edge member where the step portion is formed.

The compartment member may include at least one lateral member having a certain length and at least one longitudinal member disposed to intersect with the lateral member.

The support frame may include a vent part provided on the edge member to communicate with any one of the plurality of storage spaces.

The filtration member may include a plate-shaped supporter having a certain area and a nanofiber web layer formed of nanofiber on one surface or both surfaces of the supporter.

The communication path may be formed in each of both surfaces of the compartment member.

Still another aspect of the present invention provides a gravity-based water purification device including a housing having an internal space in which raw water is stored and the above-described filter module disposed in the internal space to filter out foreign substances included in the raw water using gravity.

The gravity-based water purification device may further include an opening/closing part connected to the outlet. Here, the filtered water produced through the filter module may be discharged outward through the opening/closing part.

According to the present invention, since filtered water may be simply produced using gravity even in poor surroundings in which power such as electricity is not supplied, fresh filtered water may be obtained even in the poor surroundings.

Also, since the present invention includes a filter module having a simple structure, manufacturing costs may be reduced.

Accordingly, according to the present invention, there is an advantage of reducing installation costs for installing additional water purification facilities and maintenance and repair costs in addition to manufacturing costs. In addition, since diseases caused by drinking contaminated water may be prevented, there is an advantage of increasing the quality of life.

DETAILED DESCRIPTION OF THE INVENTION

Figure 1:
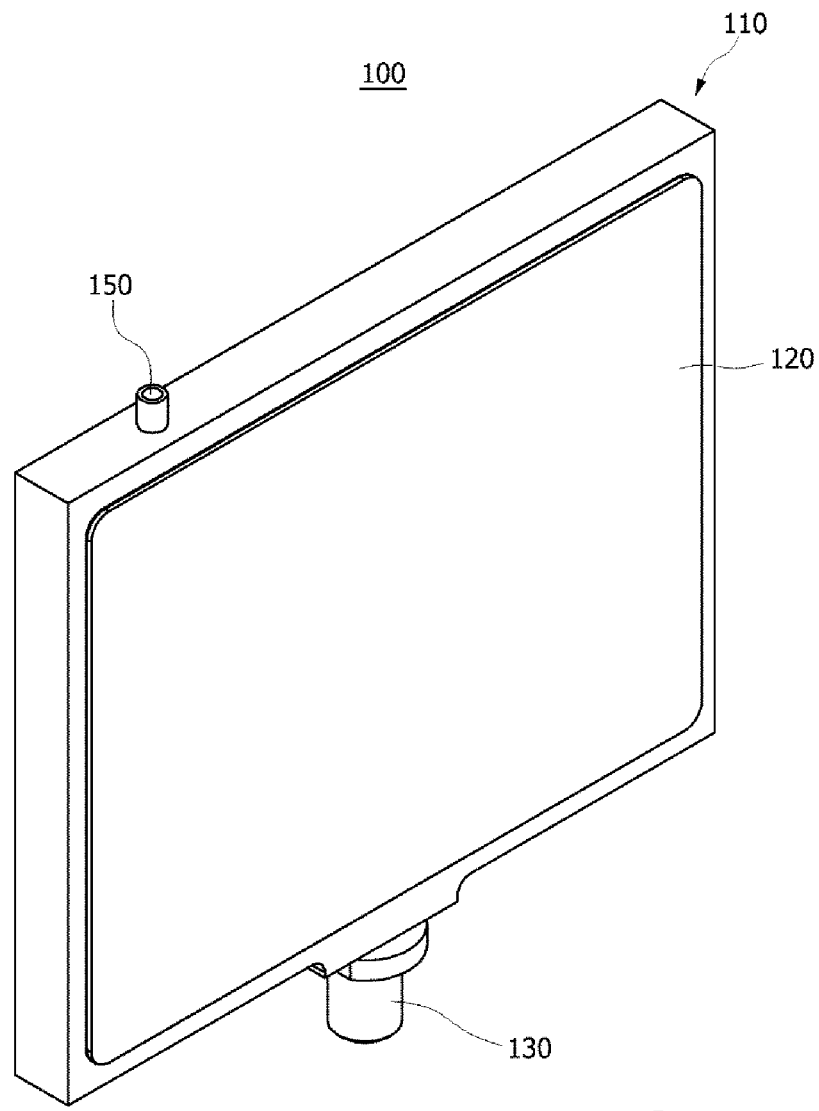
FIG. 1 is a view of a filter module for a gravity-based water purification device according to one embodiment of the present invention.

Hereinafter, embodiments of the present invention will be described in detail to be implemented by one of ordinary skill in the art with reference to the drawings. The present invention may be implemented in a variety of shapes and will not be limited to the embodiments described herein. To clearly describe the present invention, a description of an irrelevant part will be omitted from the drawings. Throughout the specification, like or similar components will be referred to as like reference numerals.

A filter module 100, 200, or 200' for a gravity-based water purification device according to one embodiment of the present invention may allow raw water to pass through a filtration member 120 due to water pressure caused by gravity or potential energy while being submerged in the raw water and may produce filtered water by removing foreign substances included in the raw water.

Figure 12:
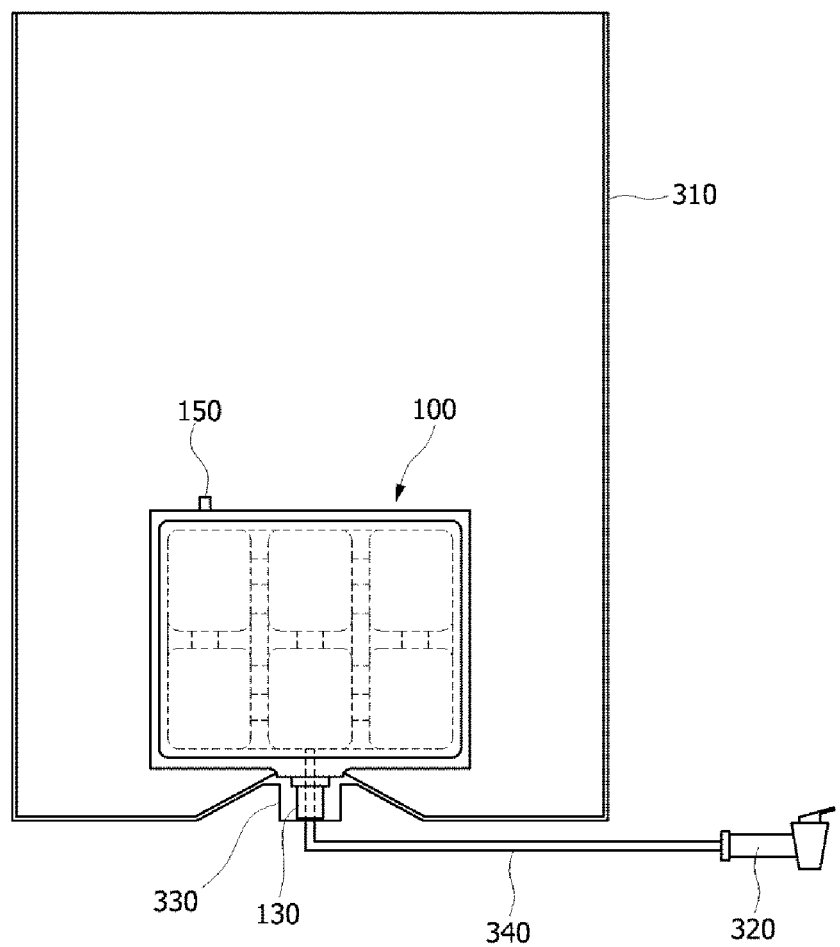
FIG. 12 is a schematic diagram illustrating a gravity-based water purification device to which the filter module of FIGS. 1 to 3 is applied.
Figure 13:
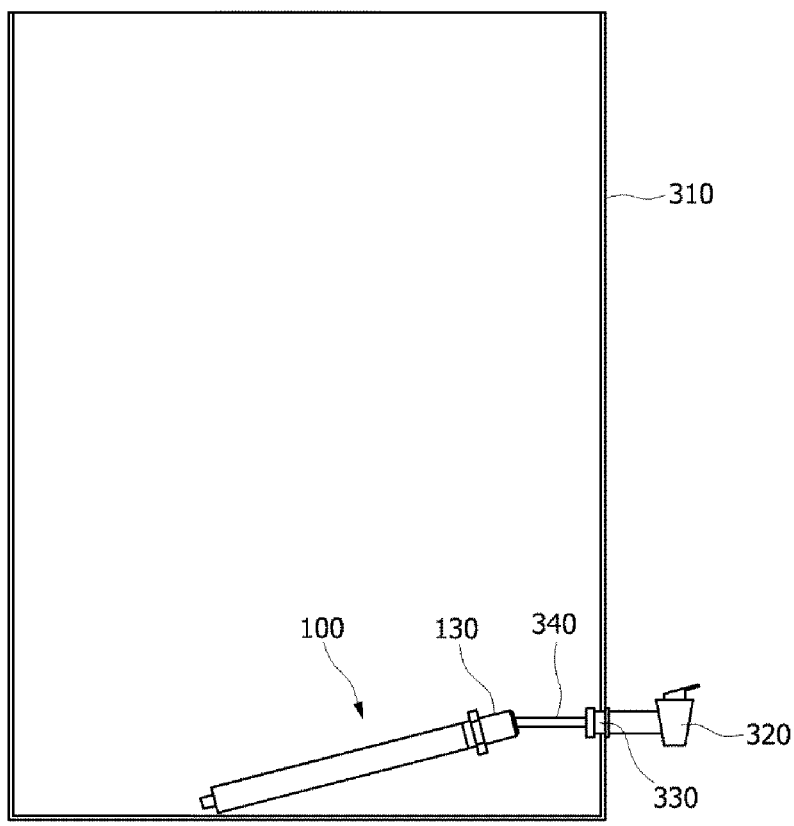
FIG. 13 is a schematic diagram illustrating a gravity-based water purification device in which the filter module of FIGS. 1 to 3 is disposed in another manner.
Figure 14:
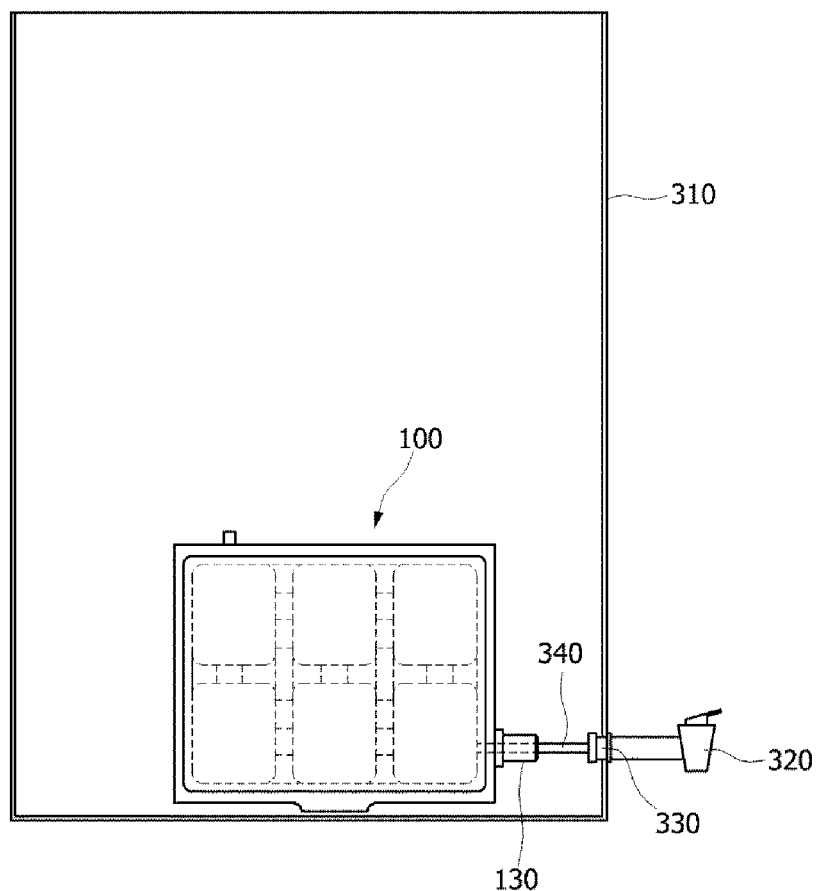
FIG. 14 is a schematic diagram illustrating a gravity-based water purification device in which the filter module of FIGS. 1 to 3 is disposed in still another manner.

That is, as shown in FIGS. 12 to 14, when the filter module 100, 200, or 200' for a gravity-based water purification device according to one embodiment of the present invention is applied to a gravity-based water purification device 1000, 2000, or 2000', the filter module 100, 200, or 200' for a gravity-based water purification device may be disposed in an internal space S of a housing 310 which stores the raw water to be submerged in the raw water.

Accordingly, in the gravity-based water purification device 1000, 2000, or 2000', the raw water around the filtration member 120 may move into the filtration member 120 through the water pressure based on gravity or potential energy so as to produce filtered water using the filter module 100, 200, or 200' for a gravity-based water purification device.

Figure 2:
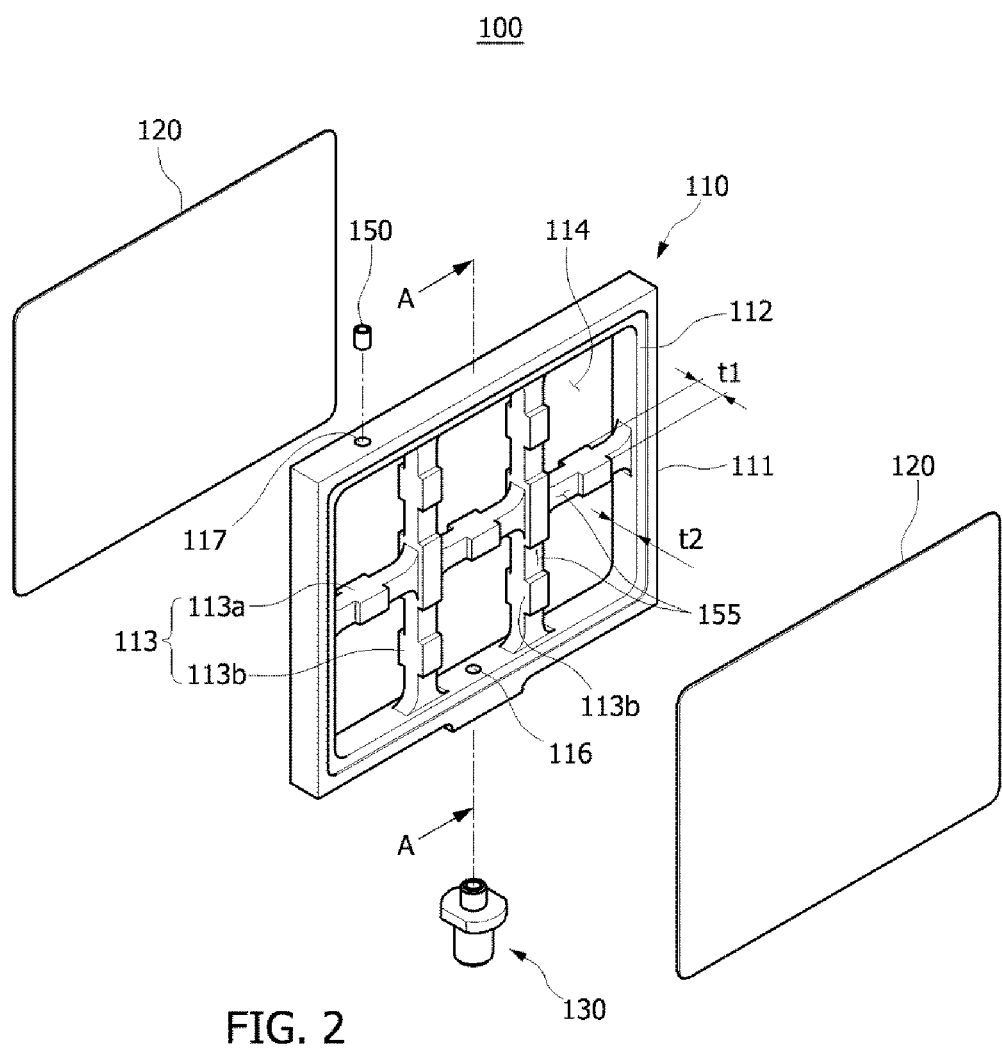
FIG. 2 is an exploded view of the filter module of FIG. 1.
Figure 3:
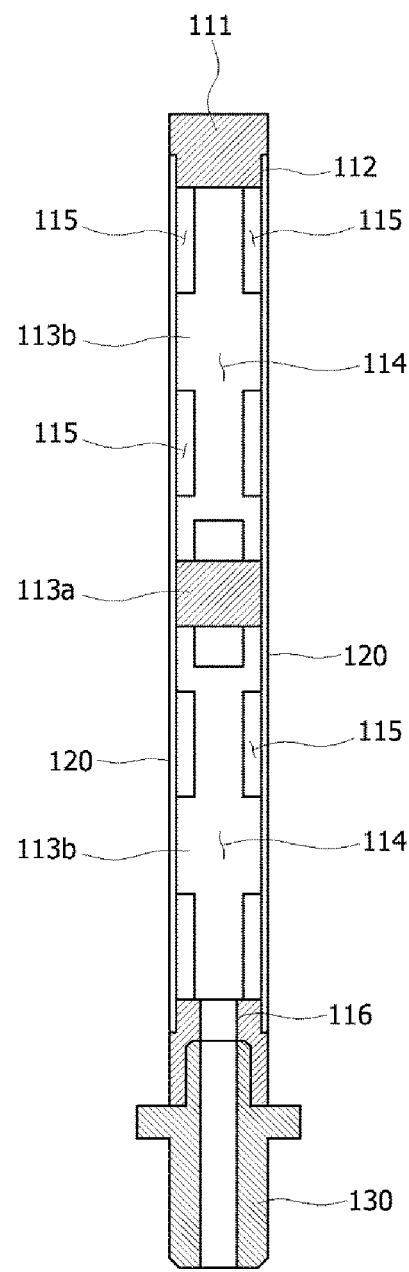
FIG. 3 is a coupled cross-sectional view taken along line A-A of FIG. 2.
Figure 4:
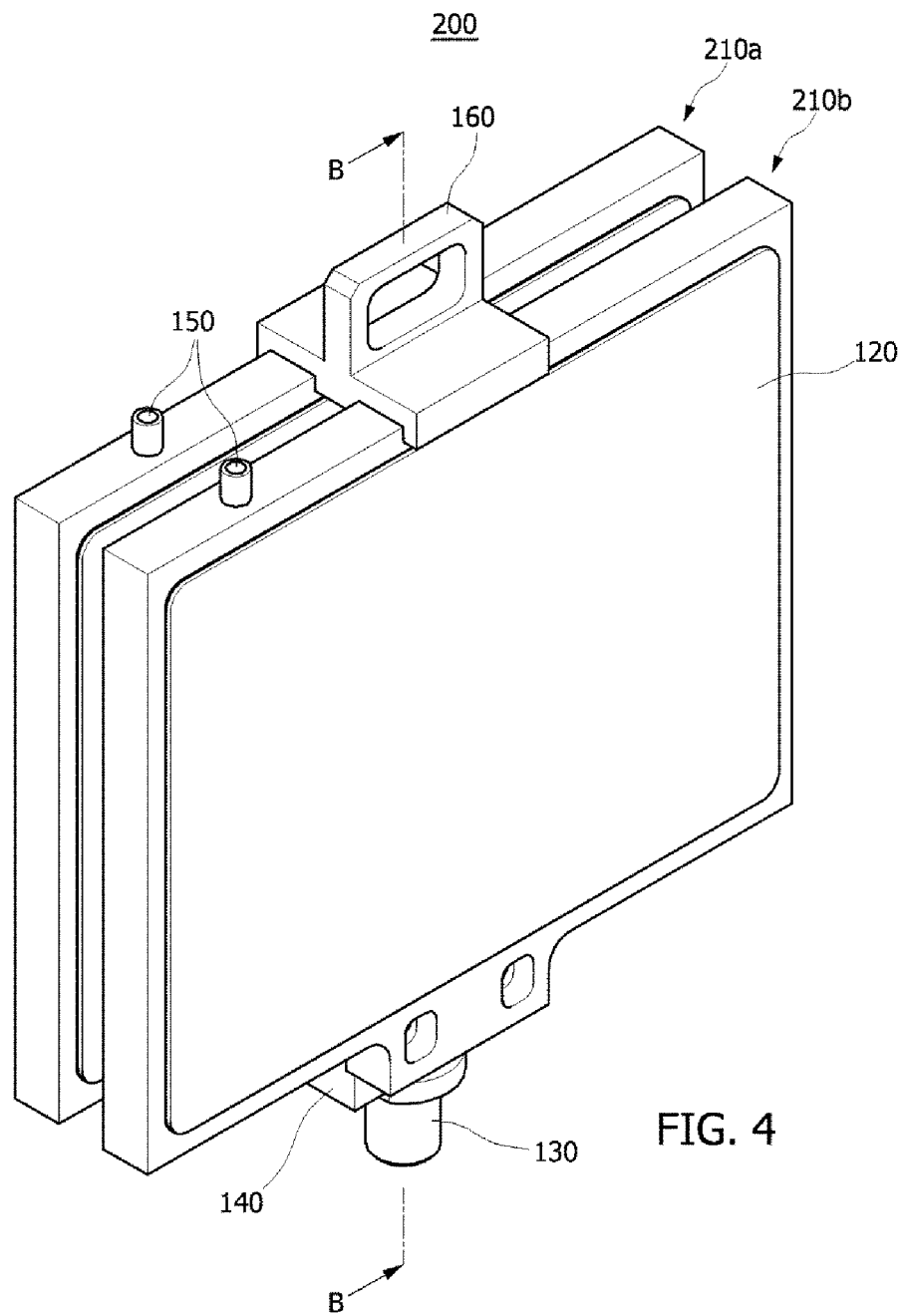
FIG. 4 is a view of a filter module for a gravity-based water purification device according to another embodiment of the present invention.

To this end, the filter module 100 for a gravity-based water purification device according to one embodiment of the present invention includes a support frame 110, the filtration member 120, and a water outlet 130 as shown in FIGS. 1 to 3.

The support frame 110 may support the filtration member 120. Also, the support frame 110 may provide a space in which filtered water produced by the filtration member 120 is temporarily stored. Here, the filtered water produced through the filtration member 120 may be discharged outward through the water outlet 130.

To this end, the support frame 110 may include an edge member 111 having a loop shape to form an empty space therein and a compartment member 113 coupled to the edge member 111 and configured to compart the empty space into a plurality of storage spaces 114.

For example, as shown in FIG. 2, the edge member 111 may be a quadrangular frame structure having both open surfaces, and the compartment member 113 may be a linear member which connects two facing sides of the edge member 111 to each other.

In addition, the compartment member 113 may include at least one lateral member 113a having a certain length and at least one longitudinal member 113b disposed to intersect with the lateral member 113a.

Accordingly, as shown in FIG. 3, when two filtration members 120 are attached to both surfaces of the edge member 111, the two filtration members 120 may be supported by both surfaces of the edge member 111 and may maintain a spaced state through a thickness of the edge member 111.

For example, the filtration member 120 may be provided as a plate-shaped sheet, and an edge side thereof may be attached to one surface of the edge member 111.

Accordingly, the filtration member 120 may maintain a plate shape through the support frame 110 to increase a contact area with the raw water so that the filtered water may be smoothly produced.

However, a shape of the edge member 111 is not limited thereto and any one of a circular shape, an arc shape, a polygonal shape, and a variety of combinations thereof according to a shape of the filtration member 120 is possible. An overall shape of the edge member 111 may adequately vary according to the shape of the filtration member 120.

Also, the compartment member 113 may include only one of the lateral member 113a and the longitudinal member 113b. In a case in which any one of a plurality of lateral members 113a and a plurality of such longitudinal members 113*b* is provided, the plurality of lateral members 113*a* or longitudinal members 113*b* may be arranged to be parallel at certain intervals.

Here, the compartment member 113 may perform a function of supporting the filtration member 120 as well as a function of computing the empty space into the plurality of storage spaces 114.

Accordingly, an edge of the filtration member 120 may be supported by the edge member 111 and an internal space of the filtration member 120 excluding the edge may be supported by the compartment member 113.

Accordingly, even when the filtration member 120 is formed as a plate-shaped sheet, the filtration member 120 may maintain the plate shape without being creased or deformed by water pressure while the raw water passes therethrough due to the water pressure based on gravity or potential energy.

To this end, the edge member 111 may include a step portion 112 formed to be recessed inward at a certain depth along an inner edge, and the step portion 112 may be formed on each of both surfaces of the edge member 111.

In this case, as shown in FIG. 2, a thickness t2 of a part of the edge member 111 where the step portion 112 is formed may be equal to a thickness t1 of the compartment member 113.

Accordingly, when a pair of the filtration members 120 are attached to both surfaces of the support frame 110, as shown in FIG. 3, the edge of the filtration member 120 may be in close contact with the step portion 112 and an inside of the filtration member 120 may be supported by the compartment member 113.

Accordingly, the filtration member 120 may be attached to the support frame 110 so that an edge side supported by the step portion 112 and an inner region supported by the compartment member 113 form a horizontal surface.

Here, the plurality of storage spaces 114 formed inside the edge member 111 by the compartment member 113 may be connected with each other. Also, at least one communication path 115 configured to allow the plurality of storage spaces 114 to communicate with each other may be formed on a side of the compartment member 113.

Accordingly, the filtered water produced while passing through the filtration member 120 may move toward the water outlet 130 via the plurality of storage spaces 114.

For example, when the compartment member 113 includes the lateral member 113*a* and the longitudinal member 113*b*, the communication path 115 may be formed in each of the lateral member 113*a* and the longitudinal member 113*b*.

In the present invention, the communication path 115 may be a through hole formed to pass through the lateral member 113*a* and the longitudinal member 113*b* or may be an accommodation groove formed to be recessed inward from one surfaces of the lateral member 113*a* and the longitudinal member 113*b*.

Also, when the communication path 115 is an accommodation groove, a bottom surface of the communication path 115 may face one surface of the filtration member 120.

That is, in a case in which the pair of filtration members 120 are attached to both surfaces of the support frame 110, the communication path 115 may be formed on each of both surfaces of the compartment member 113 so that the bottom surface faces one surface of each of the pair of filtration members 120.

Accordingly, the filtration member 120 may produce filtered water not only in a region corresponding to the storage space 114 but also a part of the compartment member 113 where the communication path 115 is formed.

Accordingly, even when the compartment member 113 supports the inner region of the filtration member 120, an area where the filtered water is not produced may be minimized so as to increase production of filtered water.

In the drawings, although the communication paths 115 formed on both surfaces of the compartment member 113 are formed at positions overlapping each other, the present invention is not limited thereto. A position of a communication path formed in one surface of the compartment member 113 and a position of a communication path formed in the other surface opposite thereto may be formed at positions not overlapped with each other.

The filtration members 120 may be attached to both surfaces of the support frame 110 as described above. Accordingly, the filtration member 120 may filter out foreign substances included in the raw water while the raw water that is an object to be filtered through gravity and water pressure moves from an outside of the filtration member 120 toward the storage space 114.

The above filtration member 120 may be a plate-shaped sheet to increase a contact area with the raw water.

Here, all well-known filtration members used to treat water may be applied to the filtration member 120. As a nonrestrictive example, the filtration member 120 may have a plate shape in which nanofiber web layers 121 are formed on one surface or both surfaces of a supporter 122.

In the present invention, the nanofiber web layer 121 may filter out foreign substances included in the raw water and the supporter 122 may perform a function of a movement path configured to support the nanofiber web layer 121 and spread the filtered water produced by the nanofiber web layer 121 overall.

Figure 11A:
FIG. 11A and FIG. 11B are schematic diagrams illustrating detailed components of a filtration member applicable to a filter module for a gravity-based water purification device according to the present invention.

As a nonrestrictive example, as shown in FIG. 11A, the filtration member 120 may have a bi-level structure in which the nanofiber web layer 121 is directly attached to one surface of the supporter 122.

Figure 11B:
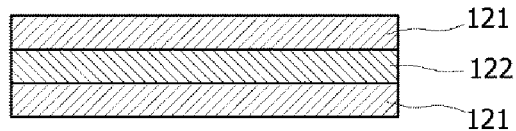

Alternatively, as shown in FIG. 11B, the filtration member 120 may have a tri-level structure in which a pair of nanofiber web layers 121 are attached to both surfaces of the supporter 122. In the above case, in the nanofiber web layers 121 attached to both sides of the supporter 122, the nanofiber web layer 121 attached to an inside may maintain an original form even when the nanofiber web layer 121 attached to an outside is damaged due to an operation such as removing of foreign substances attached to a surface and may filter the filtered water passing through the supporter 122 again so as to increase reliability of a product.

Here, the nanofiber web layer 121 may be laminated on one surface of the supporter 122 through thermal fusion, ultrasonic fusion, high-frequency fusion, or the like and the filtration member 120 may be laminated through ultrasonic fusion of one surface of the supporter 122 to one surface of the support frame 110.

Also, the supporter 122 may be a porous material so as to spread the filtered water produced through the nanofiber web layer 121. For example, the supporter 122 may be any one of generally used well-known fabric, knitted work, and non-woven fabric.

In addition, the nanofiber web layer 121 may be formed using nanofiber to filter out foreign substances included in a liquid to be filtered, and the nanofiber web layer 121 may include a nanofiber web having a three-dimensional network structure.

Here, the nanofiber may include a fiber forming component including polyacrylonitrile (PAN) and polyvinylidene fluoride (PVDF) and an emulsionizing agent configured to improve miscibility of the fiber forming component.

The above nanofiber web layer 121 may include a single layer or a multilayer.

The water outlet 130 may discharge the filtered water produced through the filtration member 120 from the plurality of storage spaces 114 to the outside.

To this end, the support frame 110 may include a discharge path 116 formed to pass through the edge member 111 to communicate with any one storage space 114 of the plurality of storage spaces 114, and the water outlet 130 may be connected to the discharge path 116.

Accordingly, the filtered water produced through the filtration member 120 may move from each of the storage spaces 114 toward the storage space 114 communicating with the water outlet 130 through the communication path 115 and then be discharged outward through the water outlet 130 via the discharge path 116.

Meanwhile, the filter module 100 for a gravity-based water purification device according to one embodiment of the present invention may include a vent part 150 configured to discharge air present in the storage space 114 to the outside.

That is, the vent part 150 may be provided in the support frame 110 to communicate with any one of the plurality of storage spaces 114.

For example, the support frame 110 may include an installation hole 117 formed to pass through the edge member 111, and the installation hole 117 may communicate with any one storage space of the plurality of storage spaces 114. In the above case, the vent part 150 may be coupled to the support frame 110 through the installation hole 117.

Here, the vent part 150 may include a hollow body fastened to the installation hole 117 and having both open ends and a vent member coupled to one open surface of the body, and the vent member may be a material selectively allowing only air to pass therethrough.

Accordingly, the vent part 150 may discharge only air included in the storage space 114 to the outside while preventing the filtered water stored in the storage space 114 from being discharged outward.

Accordingly, in the filter module 100 for a gravity-based water purification device according to one embodiment of the present invention, since the storage space 114 may secure as much available space as a volume of the air discharged to the outside when the air is discharged from the storage space 114 through the vent part 150, a much larger amount of filtered water may be accommodated.

Meanwhile, the filter module 200 or 200' for a gravity-based water purification device according to another embodiment of the present invention may further increase an area of a filtration member which comes into contact with raw water in comparison to the above embodiment. Accordingly, the filter module 200 or 200' for a gravity-based water purification device according to another embodiment of the present invention may produce a much larger amount of filtered water.

That is, in the filter module 200 or 200' for a gravity-based water purification device according to another embodiment of the present invention, as shown in FIGS. 4 to 9, a plurality of support frames 210a and 210b having both surfaces to which the pair of filtration members 120 are attached may be fixed through one connection member 160 and filtered water separately produced by the plurality of support frames 210a and 210b may be discharged outward while being integrated through one water outlet 130.

For example, in the filter module 200 or 200' for a gravity-based water purification device according to another embodiment of the present invention, one sides of the two support frames 210a and 210b having both surfaces to which the pair of filtration members 120 are attached may be fixed to each other through the connection member 160 and the two support frames 210a and 210b may include the same shape.

Hereinafter, for convenience of description, the two support frames 210a and 210b will be referred to as a first support frame 210a and a second support frame 210b.

In detail, the first support frame 210a and the second support frame 210b may support the filtration member 120 and provide a space in which the filtered water produced by the filtration member 120 is temporarily stored before being discharged outward through one water outlet 130.

To this end, the first support frame 210a and the second support frame 210b may each include an edge member 111 having a loop shape to form an empty space therein and a compartment member 113 coupled to the edge member 111 and configured to compart the empty space into a plurality of storage spaces 114.

Figure 5:
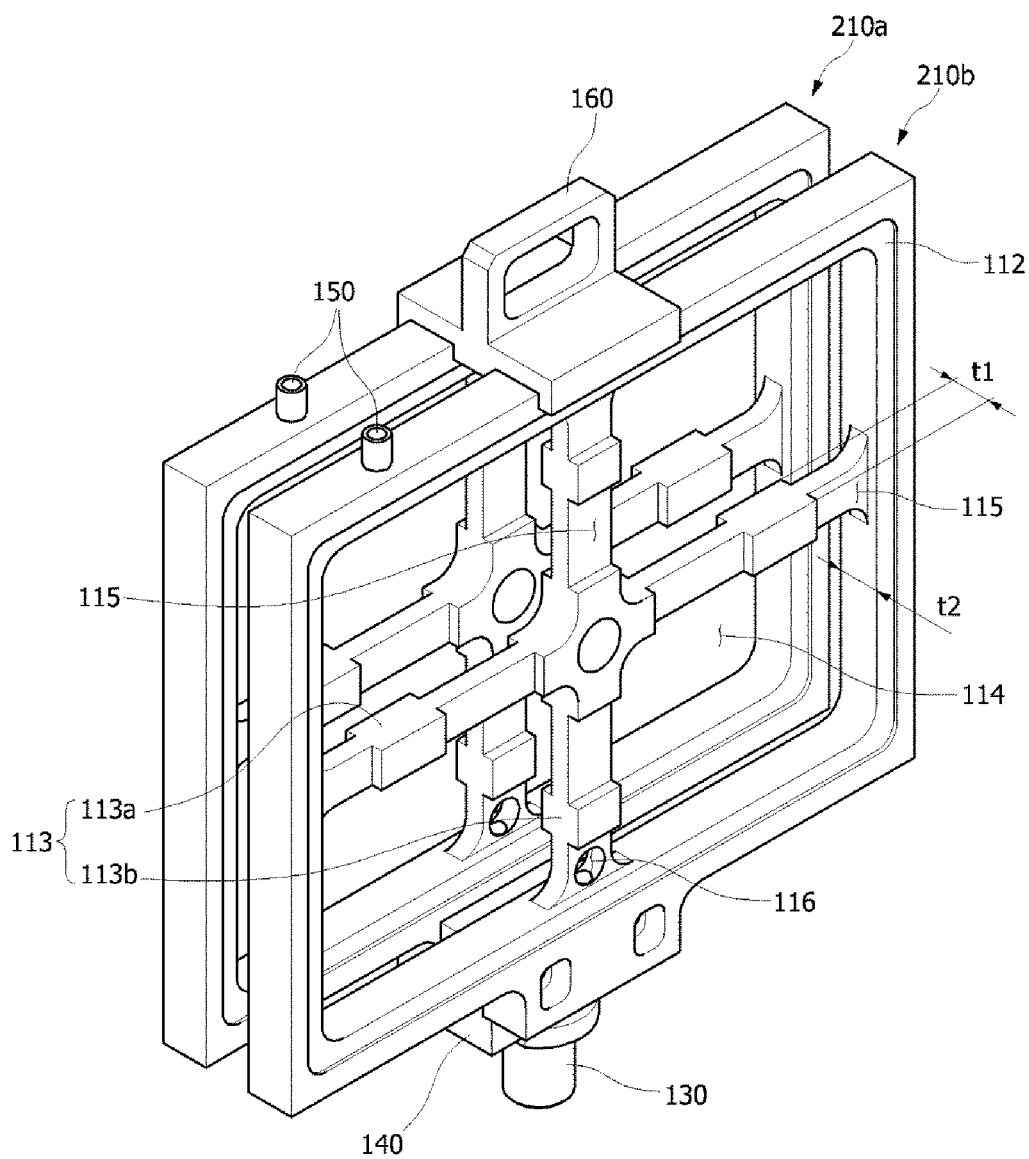
FIG. 5 is a view illustrating a state in which a filtration member is removed from FIG. 4.
Figure 6:
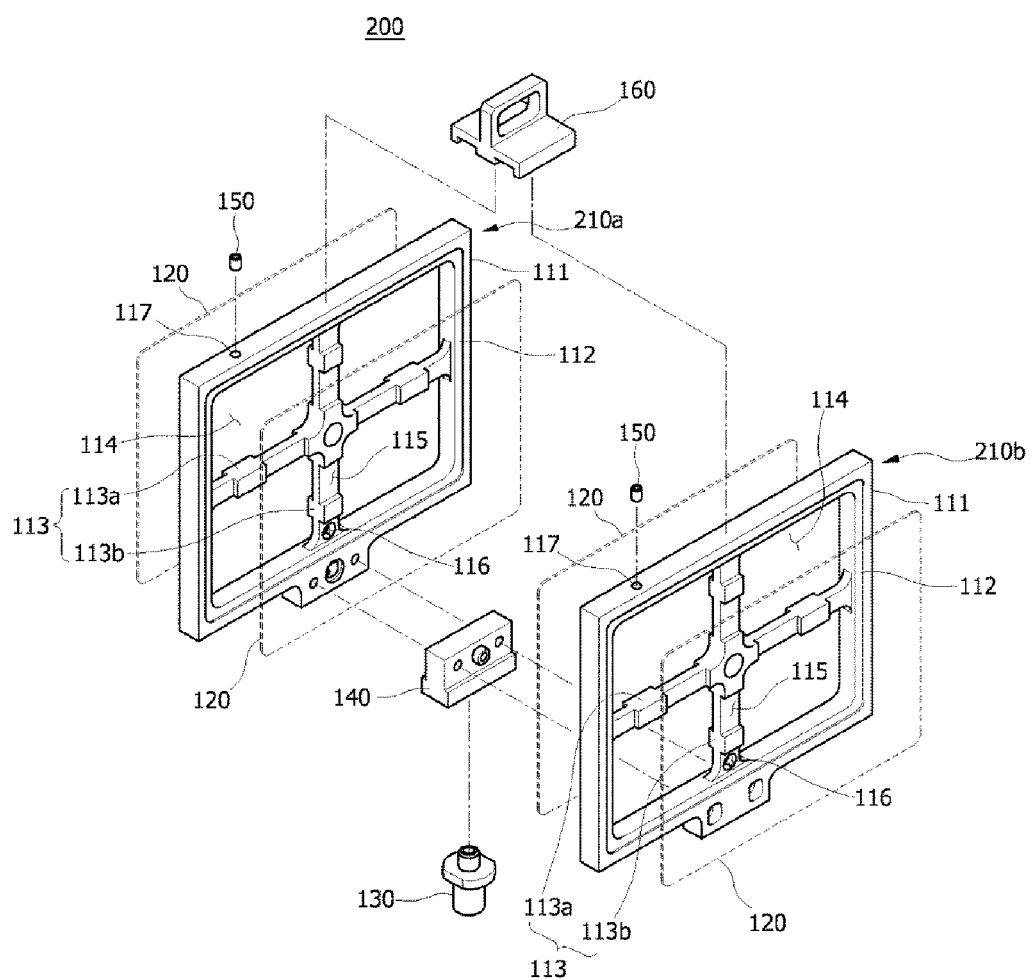
FIG. 6 is an exploded view of the filtration member of FIG. 5.
Figure 9:
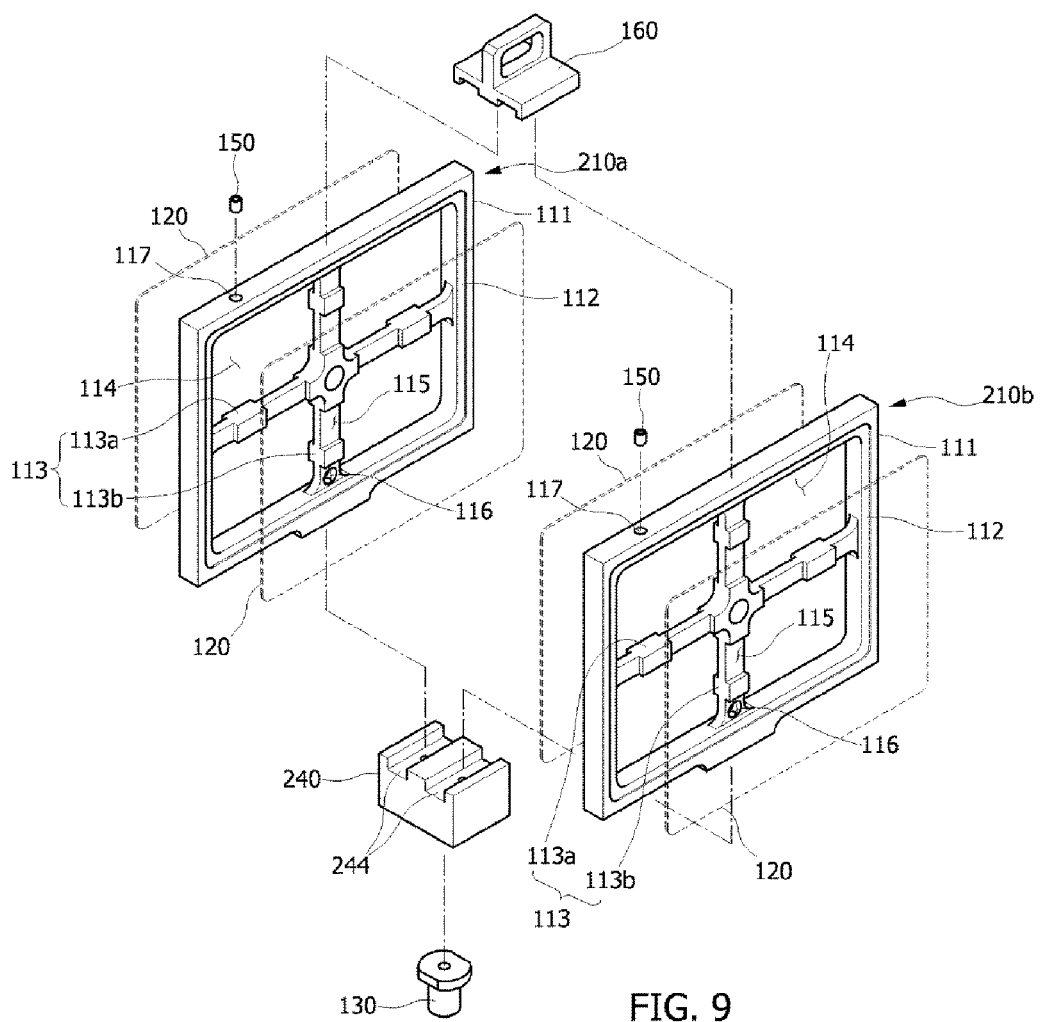
FIG. 9 is an exploded view illustrating a state in which a filtration member is removed from FIG. 8.

For example, as shown in FIGS. 5 and 9, the edge member 111 may be a quadrangular frame structure having both open surfaces, and the compartment member 113 may be a linear member which connects two facing sides of the edge member 111 to each other.

In addition, the compartment member 113 may include at least one lateral member 113a having a certain length and at least one longitudinal member 113b disposed to intersect with the lateral member 113a.

Figure 7:
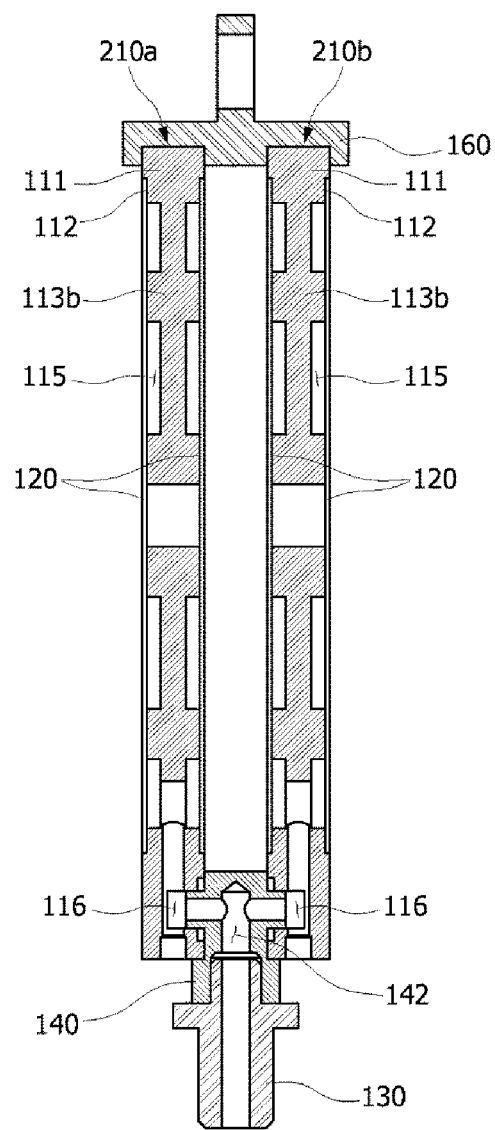
FIG. 7 is a cross-sectional view taken along line B-B of FIG. 4.
Figure 10:
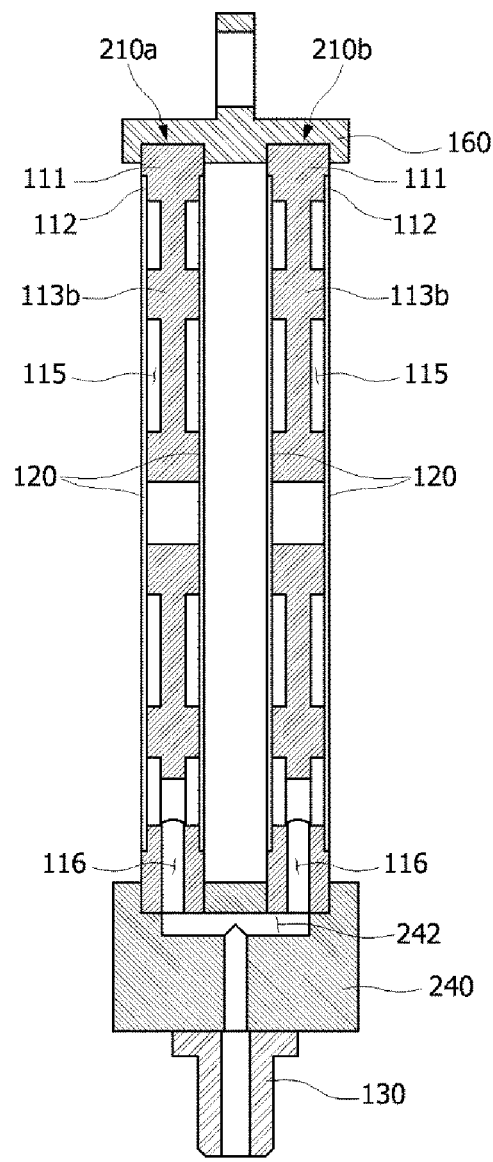
FIG. 10 is a cross-sectional view taken along line C-C of FIG. 8.

Accordingly, as shown in FIGS. 7 and 10, two filtration members 120 may be attached to both surfaces of the first support frame 210a and the second support frame 210b.

In the above case, the two filtration members 120 may be supported by both surfaces of the edge member 111, and the two filtration members 120 may maintain a state of being spaced apart from each other through a thickness of the edge member 111.

For example, the filtration member 120 may be provided as a plate-shaped sheet, and an edge side thereof may be attached to one surface of the edge member 111.

To this end, the edge member 111 may include a step portion 112 formed to be recessed inward at a certain depth along an inner edge, and the step portion 112 may be formed on each of both surfaces of the edge member 111.

In this case, as shown in FIG. 5, a thickness t2 of a part of the edge member 111 where the step portion 112 is formed may be equal to a thickness t1 of the compartment member 113.

Accordingly, when a pair of the filtration members 120 are attached to both surfaces of the first support frame 210a and the second support frame 210b, as shown in FIGS. 7 and 10, the edge of the filtration member 120 may be in close contact with the step portion 112 and an inside of the filtration member 120 may be supported by the compartment member 113.

Accordingly, the filtration member 120 may be attached to the support frame 110 so that an edge side supported by the step portion 112 and an inner region supported by the compartment member 113 form a horizontal surface.

Here, the plurality of storage spaces 114 formed inside the edge member 111 by the compartment member 113 may be connected with each other. Also, at least one communication path 115 configured to allow the plurality of storage spaces 114 to communicate with each other may be formed on a side of the compartment member 113.

Accordingly, the filter module 200 or 200' for a gravity-based water purification device according to the embodiment may increase an overall area of the filtration member which comes into contact with raw water using the two filtration members 120 attached to both surface of the first support frame 210a and the two filtration members 120 attached to both surfaces of the second support frame 210b so as to produce a much larger amount of filtered water.

In the embodiment, since the edge member 111, the compartment member 113, the filtration member 120 and the communication path 115 are equal to those described in the above embodiment, a detailed description will be omitted.

Here, the filter module 200 or 200' for a gravity-based water purification device may integrate filtered water produced through the filtration member 120 of the first support frame 210a with filtered water produced through the filtration member 120 of the second support frame 210b and then may discharge the integrated filtered water through one water outlet 130 to the outside.

To this end, the first support frame 210a and the second support frame 210b may include discharge paths 116 formed on the edge members 111 to communicate with any one storage space 114 of the respective storage spaces 114, and the discharge path 116 of the first support frame 210a and the discharge path 116 of the second support frame 210b may be connected to one common water outlet member 140 or 240.

Here, the discharge path 116 may be formed in the edge member 111 to directly communicate with any one of the plurality of storage spaces 114 defined by the edge member 111 and the compartment member 113 or may be formed on a side of the edge member 111 to be connected to the communication path 115 formed in the compartment member 113.

Also, the common water outlet member 140 or 240 may include a flow path 142 or 242 through which filtered water is movable, and the flow paths 142 and 242 formed in the common water outlet member 140 and 240 may be connected to the discharge path 116 of the first support frame 210a and the discharge path 116 of the second support frame 210b, respectively.

For example, the common water outlet member 140 may be disposed to be located between the first support frame 210a and the second support frame 210b as shown in FIGS. 4 to 7. In the above case, both surfaces of the common water outlet member 140 may be fastened to one surface of the first support frame 210a and one surface of the second support frame 210b, respectively, using additional fixing members.

Accordingly, lower parts of the first support frame 210a and the second support frame 210b which are arranged to be parallel to each other may maintain a state of being spaced apart from each other through the common water outlet member 140. Also, upper parts of the first support frame 210a and the second support frame 210b which are arranged to be parallel to each other may maintain a state of being spaced apart from each other through the connection member 160.

Accordingly, raw water may come into smooth contact with the filtration member 120 attached to one surface of the first support frame 210a and the filtration member 120 attached to one surface of the second support frame 210b which face each other.

Figure 8:
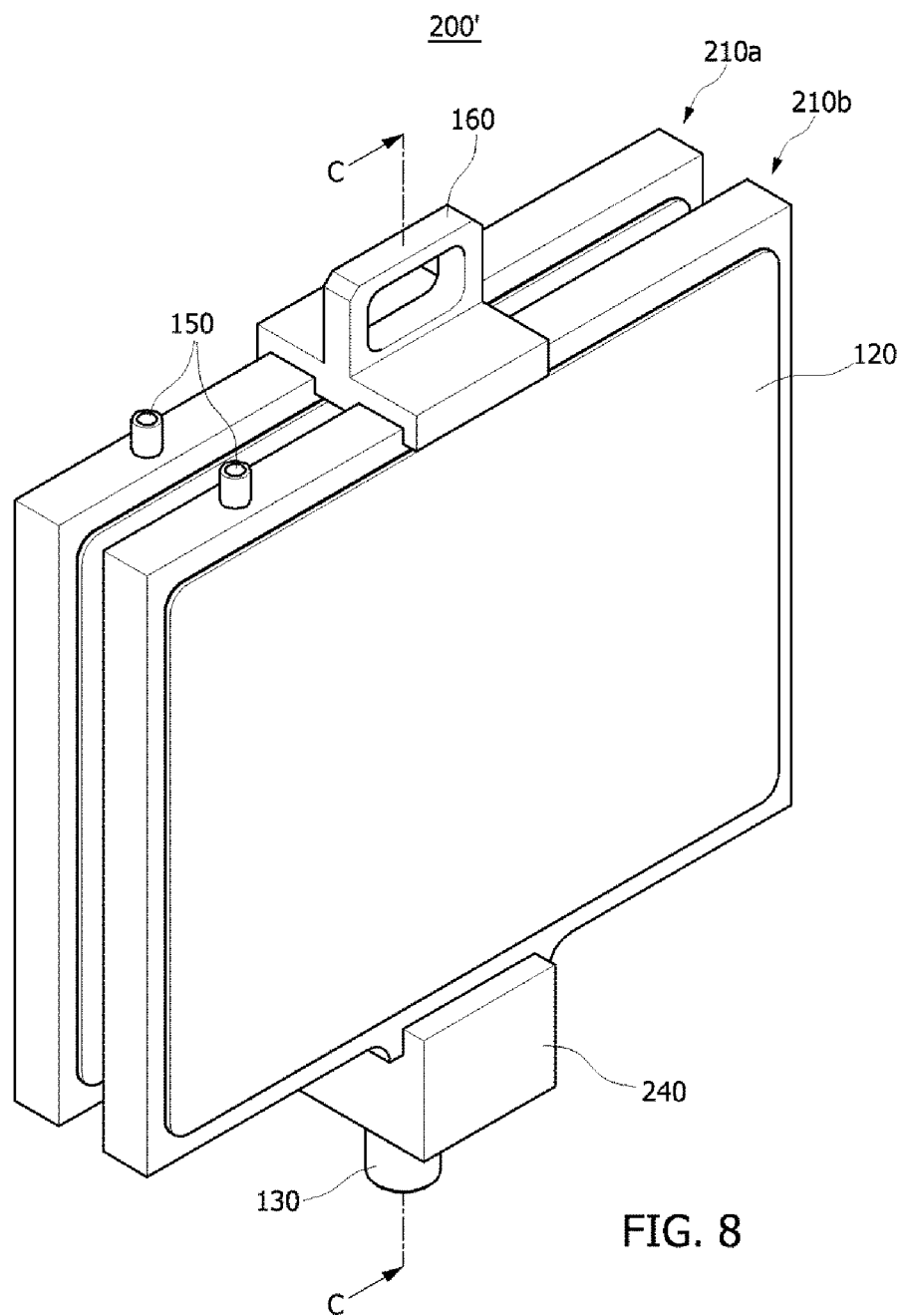
FIG. 8 is a view of a filter module for a gravity-based water purification device according to still another embodiment of the present invention.

As another example, the common water outlet member 240 may include a plurality of insertion grooves 244 formed to recede from one surface at a certain interval as shown in FIGS. 8 to 10. In the above case, one sides of the first support frame 210a and the second support frame 210b may be mounted on the insertion grooves 244, respectively.

Accordingly, when the lower parts of the first support frame 210a and the second support frame 210b which are arranged to be parallel to each other are inserted into the insertion grooves 244, respectively, the first support frame 210a and the second support frame 210b may maintain a state of being spaced apart from each other through the common water outlet member 240. Also, the upper parts of the first support frame 210a and the second support frame 210b which are arranged to be parallel to each other may maintain a state of being spaced apart from through the connection member 160.

Accordingly, raw water may come into smooth contact with the filtration member 120 attached to one surface of the first support frame 210a and the filtration member 120 attached to one surface of the second support frame 210b which face each other.

As described above, the common water outlet member 140 or 240 may perform a function of integrating filtered water produced through the filtration member 120 of the first support frame 210a with filtered water produced through the filtration member 120 of the second support frame 210b as well as a function of fixing the first support frame 210a and the second support frame 210b to each other.

The water outlet 130 may discharge the filtered water produced through the filtration member 120 from the common water outlet member 140 or 240 to the outside.

To this end, the water outlet 130 may be connected to the flow path 142 or 242 formed in the common water outlet member 140 or 240. Accordingly, the filtered water produced through the filtration member 120 in each of the support frames 210a and 210b may move from each storage space 114 to the common water outlet member 140 or 240 through the communication path 115 and the discharge path 116, and the filtered water moved toward the common water outlet member 140 or 240 may be discharged outward through the water outlet 130.

Meanwhile, like the above embodiment, the filter module 200 or 200' for a gravity-based water purification device according to the embodiment may include a vent part 150 configured to discharge air present in the storage space 114 to the outside. That is, the vent part 150 may be provided on one side of the support frame 110 to communicate with any one of the plurality of storage spaces 114.

Accordingly, like the filter module 100 for a gravity-based water purification device of the above embodiment, the filter module 200 or 200' for a gravity-based water purification device according to the embodiment may accommodate a much larger amount of filtered water corresponding to a volume of air discharged from the storage space 114.

In the embodiment, since the vent part 150 is equal to that of the embodiment shown in FIGS. 1 to 3, a detailed description thereof will be omitted.

Meanwhile, the above-described filter module 100, 200, or 200' for a gravity-based water purification device may be applied to the gravity-based water purification device 1000, 2000, or 2000' configured to produce filtered water from raw water using gravity.

That is, the gravity-based water purification device 1000, 2000, or 2000' according to one embodiment of the present invention may include the housing 310, the filter module 100 for a gravity-based water purification device, and an opening/closing part 320, as shown in FIGS. 12 to 14.

In the embodiment, although it is shown in the drawings that the filter module 100 for a gravity-based water purification device shown in FIGS. 1 to 3 is applied, the present invention is not limited thereto and the filter module 200 or 200' for a gravity-based water purification device shown in FIGS. 4 to 10 may be applied.

The housing 310 may provide a space in which raw water that is a solution to be treated is stored and the filter module 100 for a gravity-based water purification device configured to produce filtered water from the raw water is disposed.

For example, the housing 310 may have a hull shape including a certain internal space, a mount hole 330 connected to the opening/closing part 320 may be formed in one side of the housing 310, and the mount hole 330 may be connected to the water outlet 130 of the filter module 100 for a gravity-based water purification device. Here, the opening/closing part 320 may be a well-known opening/closing valve configured to allow or prevent the filtered water from being discharged outward through user's manipulation.

Here, the water outlet 130 may be directly coupled to the mount hole 330 as shown in FIG. 12 or may be connected to the mount hole 330 by a connection pipe 340 having a certain length as shown in FIGS. 13 and 14.

In addition, the filter module 100 for a gravity-based water purification device disposed in the internal space may be disposed to be located at a position close to a bottom surface of the housing 310. Accordingly, the filter module 100 for a gravity-based water purification device may be disposed to be submerged in the raw water regardless of whether an amount of the raw water stored in the internal space is large or small.

Accordingly, the gravity-based water purification device 1000, 2000, or 2000' may smoothly produce the filtered water from the raw water through gravity or water pressure.

Accordingly, the gravity-based water purification device 1000, 2000, or 2000' according to one embodiment of the present invention may produce filtered water without using additional power such as electricity so as to simply produce necessary filtered water even in severe environments in which electrical infrastructures are not installed or it is impossible or difficult to supply electric power.

Although one embodiment of the present invention has been described above, the concept of the present invention is not limited to the embodiment disclosed herein and it should be understood that one of ordinary skill in the art who understands the concept of the present invention may easily provide other embodiments through addition, changes, elimination, and the like of components without departing from the scope of the same concept which will be included in the scope of the concept of the present invention.

The invention claimed is:

1. A filter module for a gravity-based water purification device, comprising:
a first support frame and a second support frame, each comprising a loop-shaped edge member having an empty space with a first open surface opposite a second open surface, a compartment member coupled to the edge member and configured to compart the empty space into a plurality of storage spaces, and a communication path in the compartment member, configured to connect the plurality of storage spaces with each other, wherein the first support frame and the second support frame are parallel and spaced apart from each other;
a plurality of filtration members having a plate shape with a certain area and coupled to the first support frame and the second support frame, respectively, configured to produce filtered water from raw water moving from outside the filter module to the plurality of storage spaces;
a common water outlet member configured to integrate filtered water stored in the storage spaces of the first support frame with filtered water stored in the storage spaces of the second support frame:
a water outlet coupled to the common water outlet member and configured to discharge the filtered water to outside the filter module;
a first discharge path in the first support frame configured for the filtered water stored in the storage spaces of the first support frame to move toward the common water outlet member; and
a second discharge path in the second support frame configured for the filtered water stored in the storage spaces of the second support frame to move toward the common water outlet member,
wherein the common water outlet member is between the first support frame and the second support frame, and comprises a flow path for gravity-based flow of the filtered water,
wherein each of the first support frame and the second support frame is respectively fastened through fixing members on a surface of the common water outlet member so that the first discharge path and the second discharge path connect to the flow path, and
wherein the first support frame and the second support frame are spaced apart from each other through the common water outlet member.

2. A filter module for a gravity-based water purification device, comprising:
a first support frame and a second support frame, each comprising a loop-shaped edge member having an empty space with a first open surface opposite a second open surface, a compartment member coupled to the edge member and configured to compart the empty space into a plurality of storage spaces, and a communication path in the compartment member, configured to connect the plurality of storage spaces with each other, the first support frame and the second support frame being disposed to be parallel and spaced apart from each other;
a plurality of filtration members having a plate shape with a certain area and coupled to the first support frame and the second support frame, respectively, configured to produce filtered water from raw water moving from outside the filter module to the plurality of storage spaces;
a common water outlet member configured to integrate filtered water stored in the storage spaces of the first support frame with filtered water stored in the storage spaces of the second support frame;
a water outlet coupled to the common water outlet member configured to discharge the filtered water to outside the filter module;
a first discharge path in the first support frame configured for the filtered water stored in the storage spaces of the first support frame to move toward the common water outlet member; and
a second discharge path in the second support frame configured for the filtered water stored in the storage spaces of the second support frame to move toward the common water outlet member,
wherein the common water outlet member comprises a plurality of insertion grooves that recede from a surface of the common water outlet member at a certain interval, and a flow path for gravity-based flow of the filtered water, and wherein the first support frame and the second support frame are respectively mounted on the plurality of insertion grooves so that the first discharge path and the second discharge path connect to the flow path.

3. The filter module according to claim 1, wherein the communication path is an accommodation groove recessively formed in the compartment member.

4. The filter module according to claim 1, wherein the edge member includes a step portion formed along an inner edge, and
wherein an edge side of the filtration member is fixed to the step portion.

5. The filter module of claim 4, wherein a thickness of a part of the compartment member where the communication path is not formed has the same thickness as that of a part of the edge member where the step portion is formed.

6. The filter module according to claim 1, wherein the compartment member includes at least one lateral member having a certain length and at least one longitudinal member disposed to intersect with the lateral member.

7. The filter module according to claim 1, wherein each of the first support frame and the second support frame includes a vent part provided on the edge member to communicate with any one of the plurality of storage spaces.

8. The filter module according to claim 1, wherein the filtration member includes a plate-shaped supporter having a certain area and a nanofiber web layer formed of nanofiber on one surface or both surfaces of the supporter.

9. The filter module according to claim 1, wherein the communication path is formed in each of both surfaces of the compartment member.

10. The filter module of claim 1, wherein each of the first discharge path and the second discharge path is formed to be connected to the communication path.

11. The filter module of claim 1, wherein the first support frame and the second support frame are fixed to each other by at least one connection member.

12. A gravity-based water purification device comprising:
a housing having an internal space in which raw water is stored; and
the filter module according to claim 1 which is disposed in the internal space to filter out foreign substances included in the raw water using gravity.

13. The filter module according to claim 2, wherein the communication path is an accommodation groove recessively formed in the compartment member.

14. The filter module according to claim 2, wherein the edge member includes a step portion formed along an inner edge, and
wherein an edge side of the filtration member is fixed to the step portion.

15. The filter module of claim 14, wherein a thickness of a part of the compartment member where the communication path is not formed has the same thickness as that of a part of the edge member where the step portion is formed.

16. The filter module according to claim 2, wherein the compartment member includes at least one lateral member having a certain length and at least one longitudinal member disposed to intersect with the lateral member.

17. The filter module according to claim 2, wherein each of the first support frame and the second support frame includes a vent part provided on the edge member to communicate with any one of the plurality of storage spaces.

18. The filter module according to claim 2, wherein the filtration member includes a plate-shaped supporter having a certain area and a nanofiber web layer formed of nanofiber on one surface or both surfaces of the supporter.

19. The filter module according to claim 2, wherein the communication path is formed in each of both surfaces of the compartment member.

* * * * *